United States Patent

Lin

[11] Patent Number: 5,936,683
[45] Date of Patent: Aug. 10, 1999

[54] YUV-TO-RGB CONVERSION WITHOUT MULTIPLIES USING LOOK-UP TABLES AND PRE-CLIPPING

[75] Inventor: Tao Lin, Fremont, Calif.

[73] Assignee: Neo Magic Corp., Santa Clara, Calif.

[21] Appl. No.: 08/939,604

[22] Filed: Sep. 29, 1997

[51] Int. Cl.[6] ........................................... H04N 9/67
[52] U.S. Cl. ........................ 348/659; 348/660; 345/154
[58] Field of Search ................................ 348/659, 660, 348/661; 345/153, 154, 199; 358/518, 523; H04N 9/67

[56] References Cited

U.S. PATENT DOCUMENTS

| | | | |
|---|---|---|---|
| 5,124,688 | 6/1992 | Rumball | 340/703 |
| 5,396,346 | 3/1995 | Nakayama et al. | 358/448 |
| 5,402,513 | 3/1995 | Schafer | 382/47 |
| 5,457,477 | 10/1995 | Wang et al. | 345/150 |
| 5,506,604 | 4/1996 | Nally et al. | 345/154 |
| 5,510,852 | 4/1996 | Shyu | 348/660 |
| 5,546,105 | 8/1996 | Leak | 345/155 |
| 5,557,712 | 9/1996 | Guay | 395/130 |

Primary Examiner—Sherrie Hsia
Attorney, Agent, or Firm—Stuart T. Auvinen

[57] ABSTRACT

A video-input stream to a personal computer (PC) is converted from YUV format to RGB format. Two look-up tables are used. One look-up table has the Y and V components as address inputs, while the other look-up table has Y and U components as address inputs. The address inputs select one data word in the table for the Y,V or Y,U pair. Each data word contains an exact conversion to either the red component R or the blue component B since the result of the functions R=Y+1.371*V is stored in one table while the result of the function B=Y+1.732*U is stored in the other table. Each table also contains a partial green component in each data word. The Y,U table contains the result of the partial-green function (Y/2−0.698*V) in each data word, while the other table contains the result of the partial-green function (Y/2−0.336*U). An adder adds the two partial-green results from the two tables to produce the green component G. Clipping of color components to a defined range is included in the tables because the data words stored are the clipped results. Since each table has only two of the YUV components as inputs rather than all three, the size of the table is greatly reduced, even though the results are exact and not approximated. Only one add and no multiplies are required, reducing processor loading.

20 Claims, 5 Drawing Sheets

Fig. 1

PRIOR ART

YUV-TO-RGB CONVERSION WITHOUT MULTIPLIES USING LOOK-UP TABLES AND PRE-CLIPPING

BACKGROUND OF THE INVENTION

1. Field of the Invention

This invention relates to computer graphics systems, and more particularly to conversion of digital-video signals from YUV format to RGB format.

2. Description of the Related Art

Computer systems such as personal computers (PC's) display color images composed of picture elements or pixels. Each color pixel has a red, a green, and a blue component, often referred to as RGB. The RGB pixels are stored in a frame buffer before being scanned or rasterized to a display device such as a cathode-ray tube (CRT) or a flat-panel display. These RGB pixels are stored as digital values and then converted to analog voltages for CRT displays.

Higher-functionality graphics systems are becoming more common on personal computers. A video-capture port such as a zoom-video ZV port is often included. Television, video-camera, or photographic video signals can be input to a PC through such as video input port.

Television and photographic systems have used a different scheme to define colors. Instead of RGB encoding, color is defined using YUV encoding. Each color pixel in YUV encoding has a luminance component Y that represents overall brightness. The U and V components represent the color: U is the blue component that is scaled to the luminance Y, while V is the red color scaled to the luminance Y.

Since YUV encoding is entirely different from RGB encoding, video signals in the YUV format must be converted to the PC's RGB format. Once converted to the RGB color space, the video signals can be stored, manipulated and displayed on the PC.

Many prior-art color-space converters are known. See for example, U.S. Pat. Nos. 5,396,346 by Nakayama et al., 5,402,513 by Schafer, and 5,546,105 by Leak. These use a calculation-intensive approach that employs multipliers adders, and truncation or clipping.

Another approach is to use a lookup table. However, these lookup tables can be quite large. Some approaches use a combination of calculation with a lookup table. See for example, U.S. Pat. No. 5,124,668 by Rumball, and U.S. Pat. No. 5,510,852 by Shyu. Often an approximation rather than an exact conversion is used, such as shown by Rumball, where B is approximated as U+Y, rather than the more exact Y+1.732*U. These approximations are undesirable since they distort the colors of the captured images.

Figure 1:
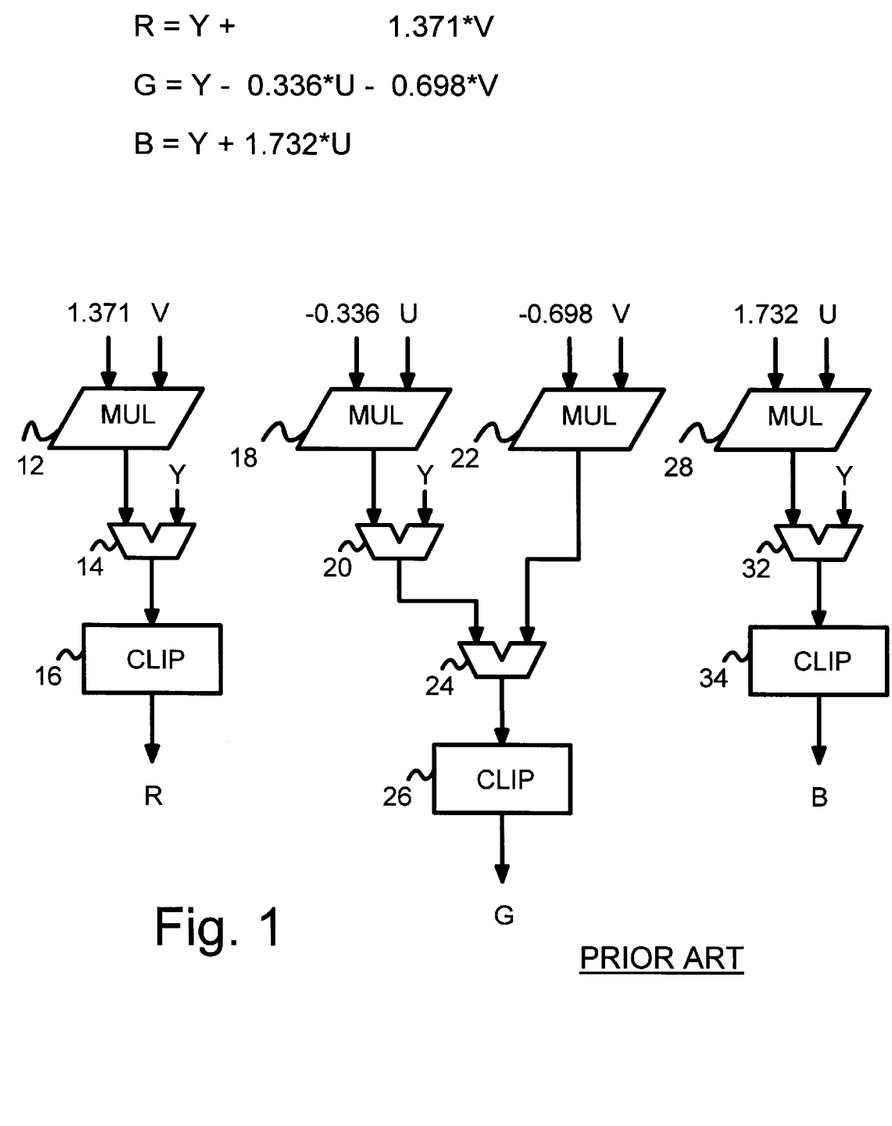
FIG. 1 is a conceptual diagram of a prior-art YUV-to-RGB converter using extensive calculation.

FIG. 1 is a conceptual diagram of a prior-art YUV-to-RGB converter using extensive calculation. The exact conversions are defined by the International Telecommunication Union, Radiocommunication Sector (ITU-R), an international standards committee in international standard ITU-R 601 (formerly CCIR-601).

The apparatus of FIG. 1 performs three calculations to convert the Y,U, and V video components to R, G, and B components. The red R component is defined as exactly Y+1.371*V. Multiplier 12 multiplies the constant 1.371 by the V component. The product from multiplier 12 is added to the Y component by adder 14. The sum from adder 14 is then clipped to a defined range by clipper 16 and then output as the red component R. Clipping is needed to keep the R component within a defined range, such as 0 to 255, when an underflow or overflow occurs during conversion, or when the YUV values are beyond the limits of the RGB color space.

The blue component B is defined as exactly Y+1.732*U. Multiplier 28 multiplies the constant 1.732 by the U component. The product from multiplier 28 is added to the Y component by adder 32. The sum from adder 32 is then clipped to a defined range by clipper 34 and output as the blue component B.

The green component G is defined as exactly Y−0.336*U−0.698*V. Multiplier 18 multiplies the constant −0.336 by the U component while multiplier 22 multiplies the constant −0.698 by the V component. The product from multiplier 18 is added to the Y component by adder 20. Adder 24 adds the sum from adder 20 to the product from multiplier 22. The sum from adder 24 is then clipped to a defined range by clipper 26 and then output as the green component G.

While the apparatus of FIG. 1 produces an exact result, many multiplies and additions are required. Four multiplies and Four additions are required. Either multiple adders and multipliers are required, or multiple steps through a single adder and multiplier are necessary. Overflow and underflow clippings are also required.

What is desired is an exact conversion from the YUV color space to the RGB color space. It is desired to not use an approximation. It is desired to reduce or eliminate the multiple adders and multipliers required for the prior-art converters. It is desired to use a relatively small look-up table without approximating the conversion.

SUMMARY OF THE INVENTION

A color-space converter has a video input that receives video-input pixels in a YUV format. Each video-input pixel has a Y component that indicates brightness of the video-input pixel but does not indicate a color of the video-input pixel. Together, a U component and a V component indicate the color of the video-input pixel but not the brightness of the video-input pixel. A pixel output outputs the video-input pixels as output pixels converted to a RGB format. Each output pixel has R, G, and B components indicating brightness of red, green, and blue colors of each output pixel.

A (Y,V) look-up table receives the Y component and receives the V component but does not receive the U component of the video-input pixel. It stores a plurality of first entries for all combinations of possible values of the Y and V components. A selected first entry is selected by the Y and V components of the video-input pixel. The selected first entry includes a red field contains the R component that is an exact conversion of the Y and V components. The selected first entry also contains a first partial G component.

A (Y,U) look-up table receives the Y component and receives the U component but does not receive the V component of the video-input pixel. It stores a plurality of second entries for all combinations of possible values of the Y and U components. A selected second entry is selected by the Y and U components of the video-input pixel. The selected second entry includes a blue field that contains the B component that is an exact conversion of the Y and U components. The selected second entry also contains a second partial G component.

An adder receives the first partial green component from the Y,V look-up table and receives the second partial green component from the Y,U look-up table. The adder outputs a sum of the first and second partial green components as the G component of the output pixel. Thus partial green components are stored in two look-up tables and summed to generate the G component.

In further aspects of the invention, conversion from the YUV format to the RGB format is performed without using a multiply operation. The R, G, and B components of the output pixel are an exact conversion from the Y, U, and V components of the video-input pixel. Thus conversion is exact and not an approximation except for an approximation from clipping.

In further aspects the red field is a result of a function equal to (Y+1.371*V) for values of Y and V that select the selected first entry. The blue field is a result of a function equal to (Y+1.732*U) for values of Y and U that select the selected second entry. The first partial green field is a result of a function equal to ($\alpha$*Y-0.698*V) for values of Y and V that select the selected first entry. The second partial green field is a result of a function equal to ((1-$\alpha$)*Y-0.336*U) for values of Y and U that select the selected second entry, where a is between 0 and 1.

DETAILED DESCRIPTION

The present invention relates to an improvement in color-space converters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Memory look-up tables are effective for implementing arbitrarily complex functions. The input variables to the function are used as an index or address into the look-up table, and the data stored at each address in the table is the result of the function when the input variables have values equal to the address.

When the input variables can take on many different values, then many different memory locations are needed in the look-up table. The resulting look-up table then becomes unacceptably large. For color-space conversions, the range of the Y, U, and V inputs can be limited to reduce the size of the look-up table, but then colors are more coarsely defined. For a rich color space, the input YUV variables should have a wide range. Such a wide range is obtained when 8 bits are used for each component, for a total or 24 bits per pixel.

The size of the look-up table can be reduced by using several tables rather than one large table. One large table requires that all three components be used as inputs—a total of 24 address bits. Such a table with 24 address bits has an unwieldy size of $2^{24}$, over 16 million address locations.

Using several tables reduces the overall number of address locations, and thus the size of the table. For example, each table can receive only two of the three Y,U,V inputs, and thus have a size of only $2^{16}$ or 64K locations. Even when four of such tables are used, the total size is only 256K, or $\frac{1}{64}^{th}$ the size of the single large table with three input variables.

The inventor has realized that look-up tables are a reasonable size when each table has only two of the three YUV color components as inputs. Since look-up tables can implement arbitrarily complex functions, most of the complexity of the conversion calculations can be migrated into the look-up tables.

Since the R and B color components are simply functions of two input YUV components and a constant, conversion to R and B can each be implemented in a look-up table. However, the green component G is a function of all three inputs—Y, U, and V, as well as constants. Thus it at first appears that a large table of three inputs is need to implement the exact conversion equation:

$$G=Y-0.336*U-0.698*V.$$

However, the inventor has realized that the equation can be re-written as:

$$G=(Y/2-0.336*U)+(Y/2-0.698*V).$$

Each of the two terms in this equation is a function of only two variables. Thus two more 2-variable tables can be used. One table receives Y and U as inputs, and outputs (Y/2-0.336*U), while the other table receives Y and V as inputs, and outputs (Y/2-0.698*V). An adder then sums the two outputs to produce the green component G.

A total of four 2-variable tables are used, with each table having 64K address locations for 24-bit color-space conversions. Only one addition is performed since the look-tables are encoded with the results of the multiplications and other additions. Clipping of inputs and outputs can also be encoded into these tables.

Figure 2:
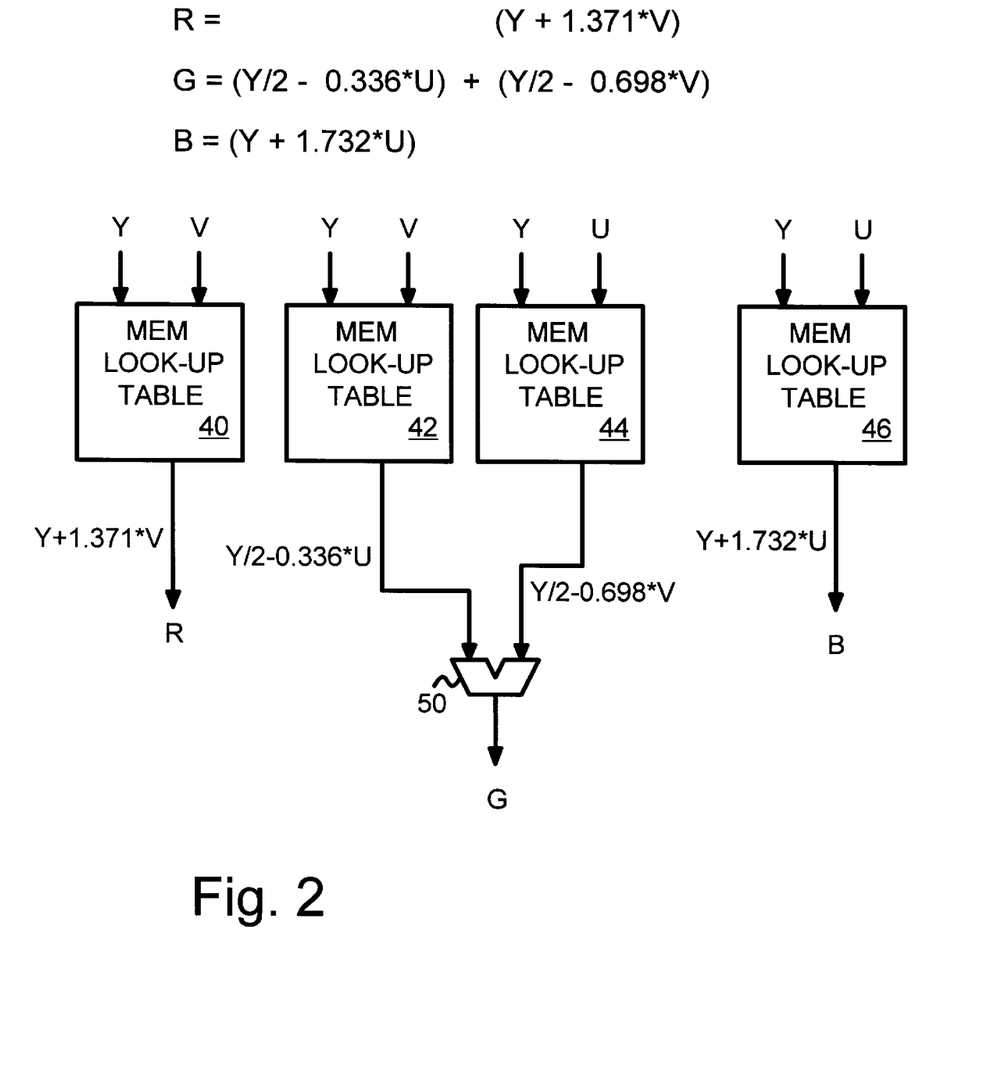
FIG. 2 is a diagram of a YUV-to-RGB converter using four look-up tables and one adder.

YUV-to-RGB Converter with 4 Tables—FIG. 2

FIG. 2 is a diagram of a YUV-to-RGB converter using four look-up tables and one adder. The conversion is exact rather than an approximation, implementing the equations:

$$R=Y+1.371*V$$

$$G=(Y/2-0.336*U)+(Y/2-0.698*V)$$

$$B=Y+1.732*U$$

where $0 \leq Y \leq 255$, $-128 \leq U \leq 127$, and $-128 \leq V \leq 127$. The Y and V input components are used as an index or address into look-up table 40, which stores Y+1.371*V for each value of Y and V. The output from table 40 is Y+1.371*V for the values of Y and V being converted. Since table 40 stores the final values clipped to the defined range for RGB values, no clipping is necessary. Instead the output from table 40 is the converted red component R.

Likewise the blue component B is converted using a single 2-variable look-up table 46. The Y and U input components address look-up table 46, which stores Y+1.732*U for each value of Y and U. The output from table 46 is Y+1.732*U for the values of Y and U being converted. No clipping is necessary. The output from table 46 is the converted blue component B.

The green component is more complex, since it is a function of all three YUV input components. Two look-up tables 42, 44 are used, each converting a different pair of input components. Table 42 converts inputs Y and V while table 44 converts inputs Y and U. Neither table produces the final G component by itself; instead, the outputs from tables 42, 44 are summed by adder 50 to generate the final green component G. Look-up table 44 stores (Y/2−0.336*U) for each Y,U pair, while table 42 stores (Y/2−0.698*V) for each Y,V pair. Overflow or underflow by adder 50 is not possible because of pre-clipping.

Figure 3:
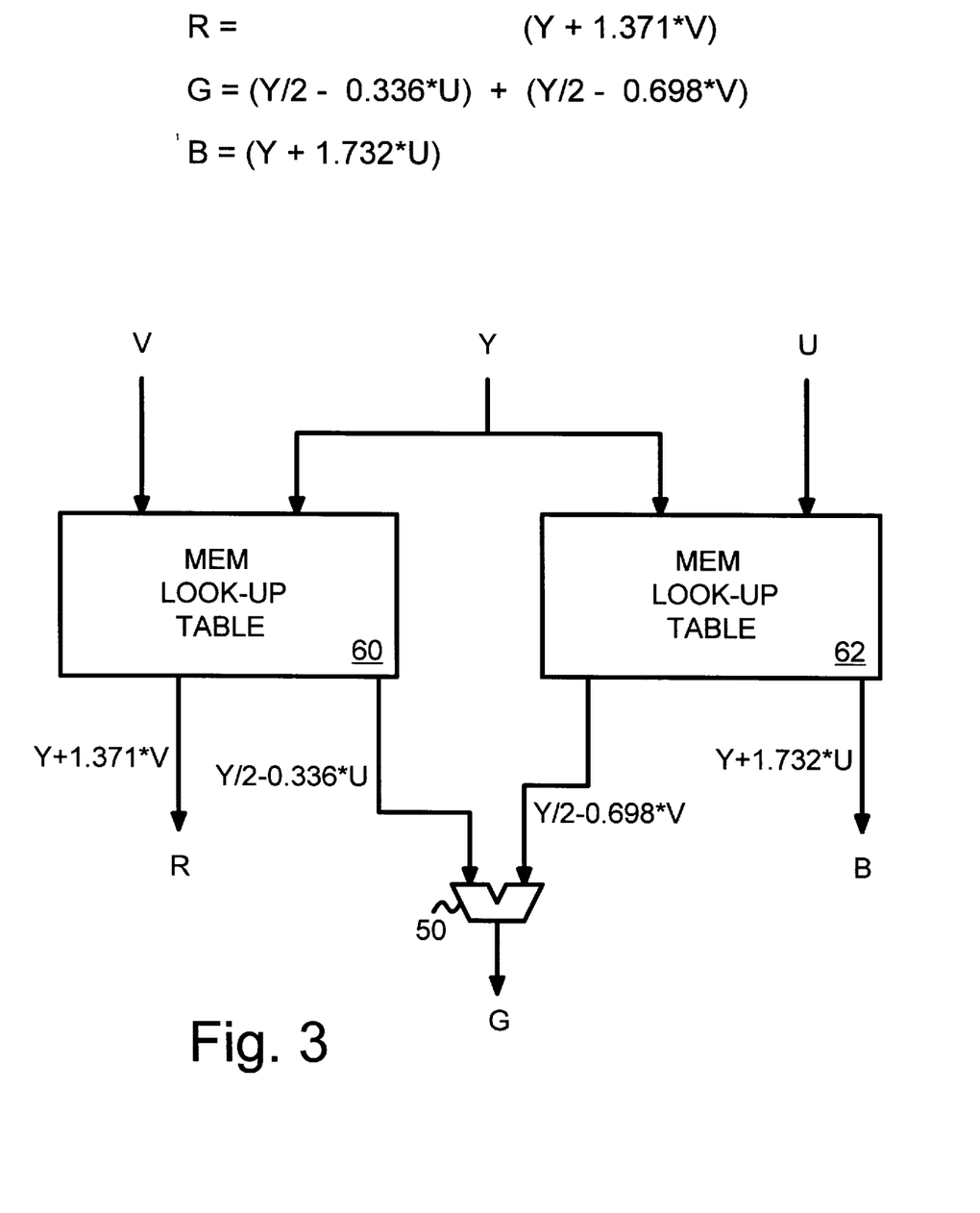
FIG. 3 is a diagram of a YUV-to-RGB converter using two look-up tables each having two input variables.

YUV-to-RGB Converter with 2 Tables—FIG. 3

FIG. 3 is a diagram of a YUV-to-RGB converter using two look-up tables each having two input variables. Since tables 40, 42 of FIG. 2 both have Y and V as inputs, they can be combined into a single table 60 by merely increasing the number of data bits stored at each Y,V memory location. Likewise, tables 44, 46 of FIG. 2 both receive Y and U as inputs, and are combined into table 62 of FIG. 3. Tables 60, 62 each output a double-width data word for each input-variable pair, while tables 40, 42, 44, 46 each output a single-width data word. For 24-bit color conversion, each single-width data word is 8 bits, while double-width data words are 16 bits.

Memory look-up table 60 outputs a double-width data word for each pair of Y, V inputs. Half of the data word is the function (Y+1.371*V), which is the red component R. The other half of the data word from table 60 is (Y/2−0.698*V), a partial G component.

Look-up table 62 also outputs a double-width data word, but for each pair of Y, U inputs. Half of the data word is the function (Y+1.732*U), which is the blue component B. The other half of the data word from table 60 is (Y/2−0.336*U), another partial G component.

Adder 50 receives the two partial green components from tables 60, 62, and outputs their sum as the green component G.

When look-up tables 60, 62 are stored in main memory, fewer memory accesses are required than when four tables 40, 42, 44, 48 of FIG. 2 are used. Four separate memory accesses are required to read four separate tables, but only two accesses are required to access two tables. A normal memory read cycle of main memory reads 32 or 64 bits, so wide data words are fetched by default. Using the wider data words is more efficient since fewer random accesses are required.

Figure 4:
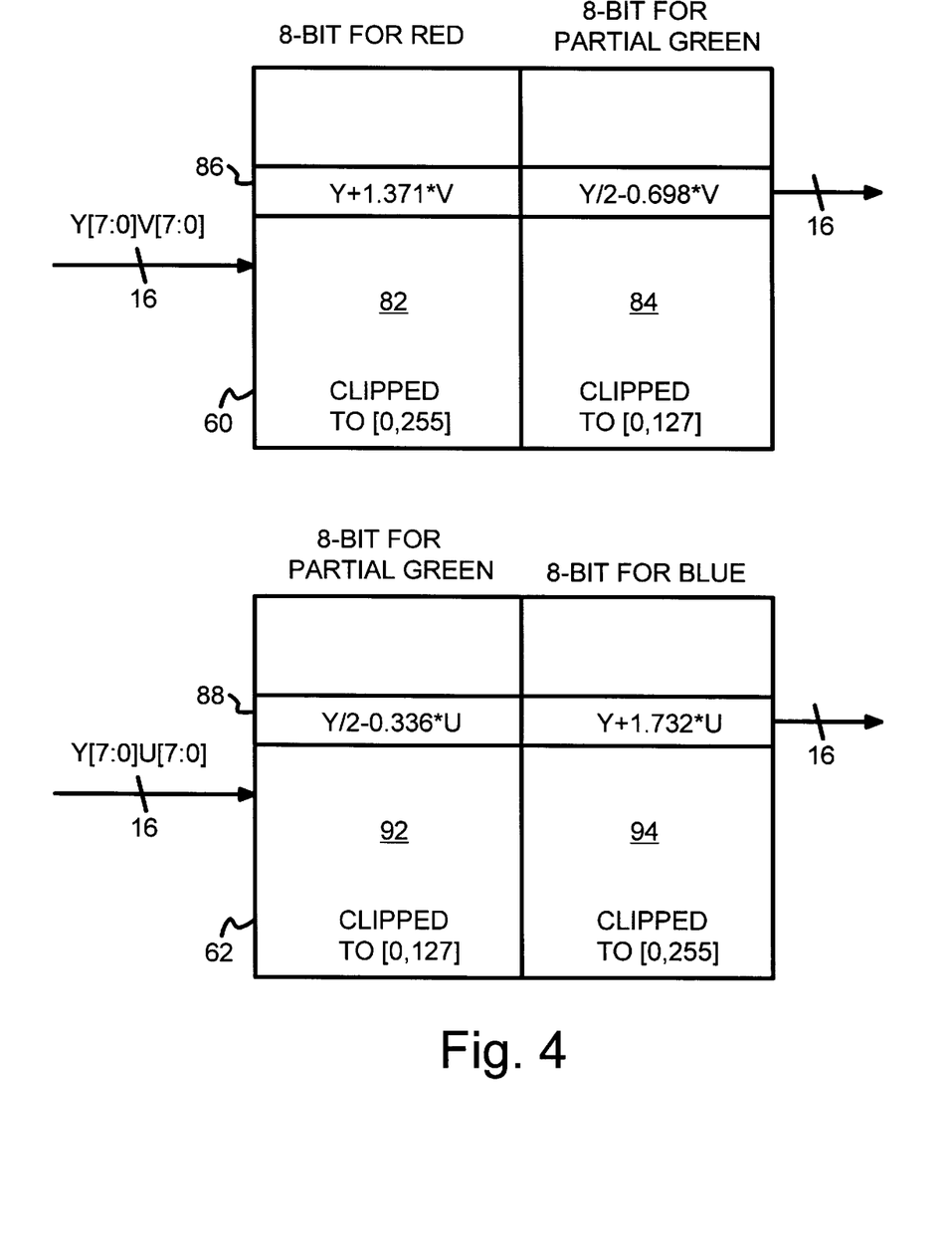
FIG. 4 is a detail of memory look-up tables using wide data words.

Detail of Wide Look-Up Table—FIG. 4

FIG. 4 is a detail of memory look-up tables using wide data words. The 8 bits of the Y input component and the 8 bits of the V input component are concatenated to produce a 16-bit address Y[7:0]:V[7:0] applied to table 60. Table 60 thus has $2^{16}$ data-word locations, or 64K words. The Y:V address selects one of the 64k words. The selected data word 86 has two portions. The first portion is the red component R, the result of the function (Y+1.371*V). Memory half 82 stores the results of the function (Y+1.371*V) for each pair of Y,V. The values of the function (Y+1.371*V) stored in memory half 82 are clipped to be in the range of 0 to 255, inclusive, so that post-clipping is not needed.

Second memory half 84 stores the results of the function (Y/2−0.698*V) for each pair of Y,V. This is a partial green component. The values of the function (Y/2−0.698*V) stored in memory half 84 are clipped to be in the range of 0 to 127. The range is reduced by about half so that no overflow is possible when the partial green component from table 60 added to the other partial green component from table 62. This reduced range ensures that post-clipping after adder 50 of FIG. 3 is not needed.

Selected data word 86 is output as a 16-bit or 15 bit data word. The upper 8 bits are split off as the red component R, while the lower 8 bits are sent to the adder as a partial green component.

For table 62, the 8 bits of the Y input component and the 8 bits of the U input component are concatenated to produce a second 16-bit address Y[7:0]:U[7:0] applied to table 62. Table 62 also has $2^{16}$ data-word locations, or 64K words. The Y:U address selects one of the 64k words. The selected data word 88 has two portions. One portion is the blue component B, the result of the function (Y+1.732*U). Memory half 92 stores the results of the function (Y+1.732*U) for each pair of Y,U. The values of the function (Y+1.732*U) stored in memory half 92 are clipped to be in the range of 0 to 255, inclusive, so that post-clipping is not needed.

Memory half 94 stores the results of the function (Y/2−0.336*U) for each pair of Y,U. This is another partial green component. The values of the function (Y/2−0.336*U) stored in memory half 94 are clipped to be in the reduced range of 0 to 127.

Selected data word 88 is output as a 16-bit data word. The lower 8 bits are split off as the blue component R, while the upper 8 bits are sent to the adder as the second partial green component. The upper 8 bits may have to be shifted down to the lower 8 bits of the data bus to be added with the same significance as the first partial green component from table 60. Alternately, memory halves 92, 94 can be swapped so that the blue components are outputs as the upper 8 bits while the partial green components are output as the lower 8 bits.

Figure 5:
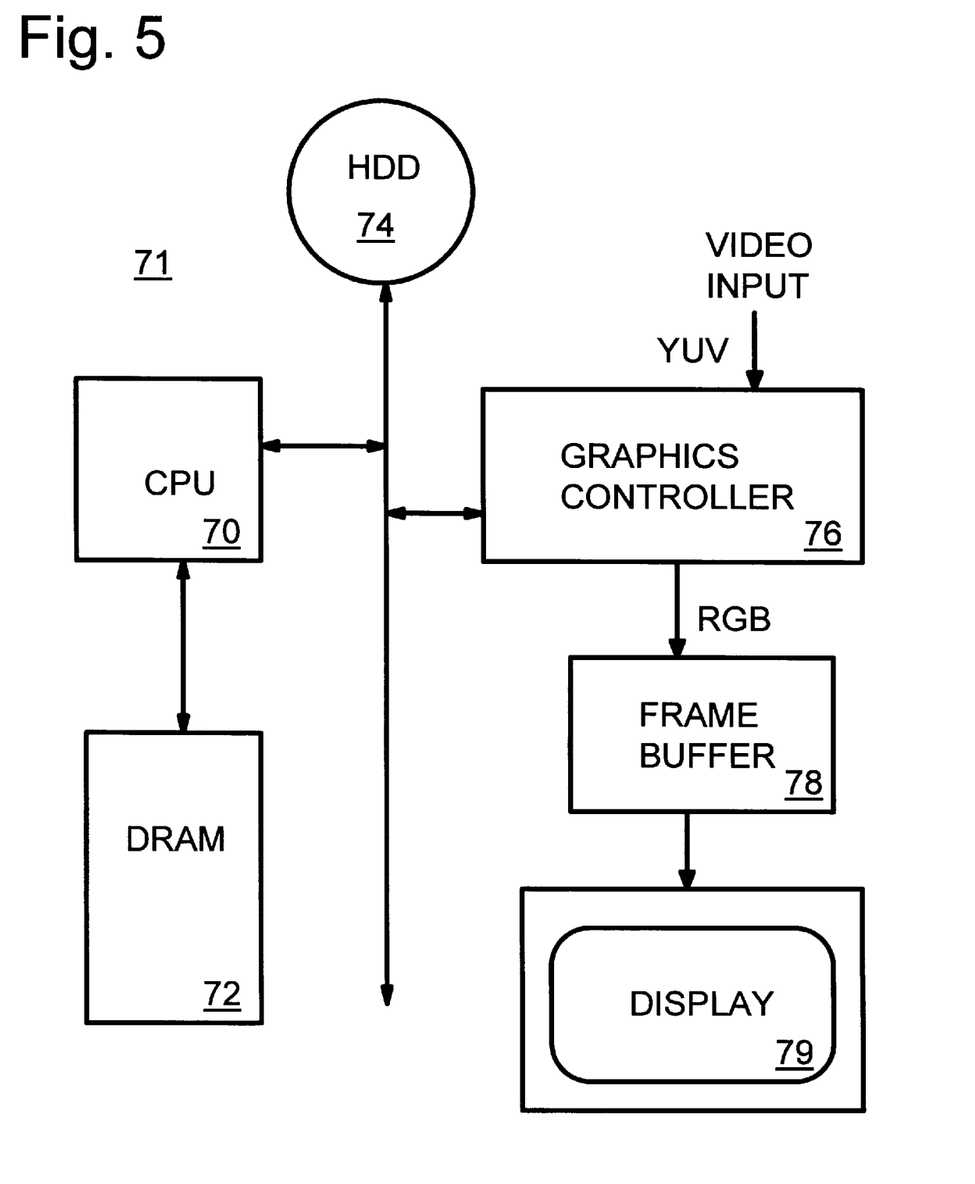
FIG. 5 is a diagram of a personal computer with a YUV-to-RGB converter.

PC With YUV-to-RGB Converter—FIG. 5

FIG. 5 is a diagram of a personal computer with a YUV-to-RGB converter. PC 71 is a multi-media PC with advanced graphics capabilities. A main processor or CPU 70 is a microprocessor such as AMD's K6 or Intel's Pentium™ processor that executes software programs including the Windows operating system. Programs and data are stored in DRAM main memory 72, and backed up to hard disk 74 for permanent storage.

Programs executing on CPU 70 update the information displayed on display 79 by making calls to operating-system functions that write to frame buffer 78. Frame buffer 78 contains a pixel-map of the lines of pixels displayed on display 79. These lines are transferred from frame buffer 78 to display 79 under control of graphics controller 76.

An external video source, such as a video camera, player, television, or receiver, is applied to a video input to graphics controller 76. The pixels from the external video source are in the YUV format, while the pixels stored in frame buffer 78 for display 79 are in the RGB format. The YUV video pixels are buffered by a FIFO in graphics controller 76 and then read to CPU 70.

In one embodiment, software executing on CPU 70 performs the YUV-to-RGB conversion. The YUV pixels are read from the FIFO buffer in graphics controller 76 to CPU 70, and perhaps first stored in another buffer in DRAM main memory 72 or even on hard disk 74. Then each pixel is converted by forming a Y,V address and a second Y, U address. The two conversion tables 60, 62 of FIG. 4 are loaded from hard disk 74 to DRAM main memory 72. CPU 70 reads the data word from DRAM main memory 72 at the Y,V address for the red component R and the first partial green component. CPU 70 then reads the second data word from table 62 in DRAM main memory 72 for the blue component B and the second partial green components. CPU 70 then adds the first and second partial green components to generate the green component G. The R, G, and B components are then written to another buffer areas of DRAM main memory 72 as the converted pixels. CPU 70 then repeats these steps for the next pixel in the video stream. These converted pixels are later stored in hard disk 74 as a video clip, or written to a portion of frame buffer 78 for display.

In other embodiments, hardware in graphics controller 76 performs the conversion from YUV to RGB format rather than CPU 70. The look-up tables 60, 62 of FIG. 4 can reside in DRAM main memory 72 or in a spare or additional part of frame buffer 78.

ADVANTAGES OF THE INVENTION

The invention uses less of the processor's computational bandwidth because the computations for color-space conversion are encoded into the data stored in the look-up tables. While a full-computation approach without look-up tables requires four multiplies and four adds, the invention requires only one add. Multiplies are very compute-intensive, requiring multiple cycles in a CPU's ALU, or a dedicated multiplier. Adds are usually executed in just one cycle on the ALU's adder; special hardware is not required. Thus the invention not only uses fewer computational operations, but it uses the simpler add operation and eliminates all of the complex multiply operations.

Clipping, or restricting the inputs and outputs to a defined range, is performed by the look-up tables. This eliminates additional testing, rounding, or truncating operations by the processor, or dedicated clipping hardware. The results stored in the lookup table are simply clipped before being stored into the table. Thus the encoding of the table itself includes clipping as one of the functions encoded by the look-up tables.

The higher performance of the invention allows for real-time processing of video input streams, and frees the PC's processor for other tasks. The user is aware of the released processor resources by increased responsiveness of user applications. Since video input streams are often used with other processor-intensive applications, the reduced processing requirements of the invention is especially noticeable.

Using several tables reduces the overall number of address locations, and thus the size of the table. For example, each table can receive only two of the three Y,U,V inputs, and thus have a size of only $2^{16}$ or 64K locations. Even when four of such tables are used, the total size is only 256K, or $1/64^{th}$ the size of the single large table with three input variables.

ALTERNATE EMBODIMENTS

Several other embodiments are contemplated by the inventors. For example the conversion can be performed on the general-purpose adder in the CPU's arithmetic-logic-unit (ALU), or in a floating point unit, or in dedicated hardware on the graphics or multi-media controller. YUV format is sometimes referred to as YCrCb format, where Cr is called the red color difference component, and Cb is called the blue color difference component. The invention can be applied to other systems besides personal computers, and may be applied to many variations or kinds of personal computers.

Other precisions of the YUV and the RGB components can be used with the invention. For example, YUV can have 8-7-7 precision, with 8 bits of precision for Y, but only bits of precision for each of U and V. Using only seven bits for U and V eliminates one address bit into the tables, and thus reduces the size of the table by one-half. An RGB precision of 5-6-5 is sometimes used; reduced-width data words having only 5 bits for the red component and 5 bits for the blue components, and 5 bits for the partial green components is used.

The partial green components can contain different proportions of the Y component. In the example described, each partial green components included half of the Y component, or Y/2. This is optimum since most partial green values do not have to be clipped and thus distorted. However, different proportions are contemplated. For example, the first partial green component could use Y/4 while the second uses Y*¾. In that case, the green equation is changed to:

$$G=(Y/4-0.336*U)+(Y*¾-0.698*V).$$

The more general case is where the proportion of Y among the two tables is represented by the parameter alpha α:

$$G=(\alpha*Y-0.336*U)+((1-\alpha)*Y-0.698*V).$$

Other proportions are also possible, and it is even possible to have one of the partial green components to have no Y while the other has all of Y, although this is not desirable because of distortion from clipping.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A color-space converter comprising:

a video input for receiving video-input pixels in a YUV format, each video-input pixel having a Y component indicating brightness of the video-input pixel but not indicating a color of the video-input pixel, and a U component and a V component together indicating the color of the video-input pixel but not the brightness of the video-input pixel;

a pixel output for outputting the video-input pixels as output pixels converted to a RGB format, each output pixel having R, G, and B components indicating brightness of red, green, and blue colors of each output pixel;

a Y,V look-up table, receiving the Y component and receiving the V component but not receiving the U component of the video-input pixel, for storing a plurality of first entries for all combinations of possible values of the Y and V components, a selected first entry being selected by the Y and V components of the video-input pixel;

the selected first entry including a red field containing the R component that is an exact conversion of the Y and V components, the selected first entry also containing a first partial G component;

a Y,U look-up table, receiving the Y component and receiving the U component but not receiving the V component of the video-input pixel, for storing a plurality of second entries for all combinations of possible values of the Y and U components, a selected second entry being selected by the Y and U components of the video-input pixel;

the selected second entry including a blue field containing the B component that is an exact conversion of the Y and U components, the selected second entry also containing a second partial G component; and an adder, receiving the first partial green component from the Y,V look-up table and receiving the second partial green component from the Y,U look-up table, the adder outputting a sum of the first and second partial green components as the G component of the output pixel, whereby partial green components are stored in two look-up tables and summed to generate the G component.

2. The color-space converter of claim 1 wherein conversion from the YUV format to the RGB format is performed without using a multiply operation.

3. The color-space converter of claim 2 wherein the R, G, and B components of the output pixel are an exact conversion from the Y, U, and V components of the video-input pixel, wherein conversion is exact and not an approximation except for an approximation from clipping.

4. The color-space converter of claim 2 wherein the plurality of first entries has a total number of entries equal to a number of bits of precision of the Y component multiplied by a number of bits of precision of the V component; and wherein the plurality of second entries has a total number of entries equal to a number of bits of precision of the Y component multiplied by a number of bits of precision of the U component, whereby a size of the Y,V look-up table and a size of the Y,U look-table is determined by a number of precision bits for the Y, U, and V components.

5. The color-space converter of claim 2 wherein the red field is a result of a function equal to (Y+1.371*V) for values of Y and V that select the selected first entry;

wherein the blue field is a result of a function equal to (Y+1.732*U) for values of Y and U that select the selected second entry.

6. The color-space converter of claim 5 wherein the first partial green field is a result of a function equal to ($\alpha$Y−0.698*V) for values of Y and V that select the selected first entry;

wherein the second partial green field is a result of a function equal to ((1−$\alpha$)*Y−0.336*U) for values of Y and U that select the selected second entry, wherein $\alpha$ is between 0 and 1.

7. The color-space converter of claim 2 wherein the Y,V look-up table and the Y, U look-up table are each stored in a main memory of a personal computer.

8. The color-space converter of claim 7 wherein the adder is an adder in a general-purpose microprocessor controlling the personal computer.

9. The color-space converter of claim 8 wherein the video input is a zoom-video port on the personal computer that receives a stream of the video-input pixels.

10. The color-space converter of claim 9 wherein the output pixels are written to a frame buffer that drives a display for the personal computer.

11. A YUV-to-RGB converter comprising:

a first table of conversion entries selected by a Y component and by a V component of an input pixel, the first table outputting an R component indicating a red color of an output RGB pixel and a first partial-green component;

a second table of conversion entries selected by the Y component and by a U component of the input pixel, the second table outputting a B component indicating a blue color of the output RGB pixel and a second partial-green component;

an adder, receiving the first and second partial-green components, for outputting a sum of the first and second partial-green components as a G component indicating a green color of the output RGB pixel; and frame-buffer means, receiving the R component from the first table, the B component from the second table, and the G component from the adder, for storing output RGB pixels for display that are converted from the Y, U, and V components of input pixels, whereby the Y, U, and V components of the input pixels are converted to the output RGB pixels by the first and second tables and the adder.

12. The YUV-to-RGB converter of claim 11 wherein neither the first partial-green component nor the second partial-green component independently indicates the green color of the output RGB pixel.

13. The YUV-to-RGB converter of claim 12 wherein the output RGB pixel has exactly a same color as the input pixel, whereby conversion is exact and not approximated except for an approximation from clipping.

14. The YUV-to-RGB converter of claim 13 wherein each input pixel is in a YUV format having the Y component indicating brightness of the input pixel but not indicating a color of the input pixel, and the U and V components indicating the color of the input pixel but not the brightness of the input pixel;

wherein the output RGB pixels are stored in a RGB format, each output RGB pixel having R, G, and B components indicating brightness of red, green, and blue colors of each output RGB pixel.

15. The YUV-to-RGB converter of claim 14 wherein the first and second partial-green components have a reduced number of bits of precision while the G component has a full number of bits of precision, the reduced number being at least one less than the full number, whereby overflow and underflow of the adder is prevented, eliminating a need to clip the G component.

16. The YUV-to-RGB converter of claim 14 wherein the first table stores the R component for each pair of the Y and V components as a result of a function Y +1.371*V, the first table also storing the first partial-green component for each pair of the Y and V components as a result of a function (Y/2−0.698*V).

17. The YUV-to-RGB converter of claim 16 wherein the first table stores the R component and the first partial-green component for a pair of Y and V components in adjacent memory locations that are addressed and accessed together in a single memory access, whereby the first table stores the R component and the first partial-green component together.

18. The YUV-to-RGB converter of claim 17 wherein the second table stores the B component for each pair of the Y and U components as a result of a function Y +1.732*U, the second table also storing the second partial-green component for each pair of the Y and U components as a result of a function (Y/2−0.336*U), and wherein the second table stores the B component and the second partial-green component for a pair of Y and U components in adjacent memory locations that are addressed and accessed together in a single memory access, whereby the second table stores the B component and the second partial-green component together.

19. A computer-implemented method for converting YUV pixels to RGB pixels, the computer-implemented method comprising the steps of:

receiving an input stream of input pixels in a YUV format, each input pixel having Y, U, and V components;

forming a first address by concatenating the Y component and the V component;

applying the first address to a first table, the first address selecting a selected first entry in the first table;

writing a portion of the selected first entry as an R component for a converted pixel the converted pixel having a same brightness and color as the input pixel;

sending a remaining portion of the selected first entry to an adder as a first partial-green component;

forming a second address by concatenating the Y component and the U component;

applying the second address to a second table, the second address selecting a selected second entry in the second table;

writing a portion of the selected second entry as a B component for a converted pixel the converted pixel having a same brightness and color as the input pixel;

sending a remaining portion of the selected second entry to the adder as a second partial-green component;

adding the first partial-green component to the second partial-green component and outputting a sum as a G component for the converted pixel; and storing the converted pixel to a display buffer for display by a RGB display, each converted pixel having the R, G, and B components indicating brightness of red, green, and blue colors of each converted pixel;

wherein each input pixel is in a YUV format having the Y component indicating brightness of the input pixel but not indicating a color of the input pixel, and the U and V components indicating the color of the input pixel but not the brightness of the input pixel, whereby YUV input pixels are converted to the converted pixels in RGB format.

20. The computer-implemented method of claim 19 wherein the step of applying the first address to the first table comprises executing an instruction in a program executing on a general-purpose microprocessor that generates a memory-access cycle, the first table residing in main memory.

* * * * *